United States Patent [19]

Jacob et al.

[11] Patent Number: 5,577,854
[45] Date of Patent: Nov. 26, 1996

[54] SINGLE SHEAR JOINT

[75] Inventors: William V. Jacob, Pittsburgh, Pa.; Jerry L. Newton, Richmond, Ind.; Harold G. Brilmyer, Grosse Pointe; James L. Luttinen, Brighton, both of Mich.

[73] Assignee: General Motors Corporation, Detroit, Mich.

[21] Appl. No.: 441,508

[22] Filed: May 15, 1995

[51] Int. Cl.⁶ .................. F16D 1/00; B25G 3/10
[52] U.S. Cl. ............... 403/2; 403/220; 403/225; 403/291; 403/372; 280/96.1; 280/660; 280/716; 411/383; 411/546
[58] Field of Search ................. 403/220, 221, 403/225, 227, 228, 291, 365, 372, DIG. 5; 280/96.1, 660, 673, 716; 411/546, 383, 384

[56] References Cited

U.S. PATENT DOCUMENTS

| 2,827,303 | 3/1958 | Herbenar | 403/228 X |
| 2,935,347 | 5/1960 | Liversage | 403/227 |
| 3,039,831 | 6/1962 | Thomas | 280/96.1 X |
| 3,365,213 | 1/1968 | Bentley et al. | 403/225 X |
| 4,435,112 | 3/1984 | Becker | 411/546 X |

FOREIGN PATENT DOCUMENTS 605940  9/1960  Canada ........................ 403/227

Primary Examiner—Kenneth J. Dorner
Assistant Examiner—Bruce A. Lev
Attorney, Agent, or Firm—Jeffrey A. Sedlar

[57] ABSTRACT

A single shear joint is provided which includes a conical ferrule establishing a nesting means of engagement with controlled embedment between a link and a mating component.

4 Claims, 1 Drawing Sheet

SINGLE SHEAR JOINT

TECHNICAL FIELD

The present invention relates to a mechanical single shear joint.

BACKGROUND OF THE INVENTION

Conventional single shear joints are found in various applications including simple lap joints as often used for vehicle suspension links. A known suspension link joint typically includes a resilient bushing positioned in a link end opening having a metal inner sleeve through which a mounting bolt is extended for joining the link with a mating suspension component such as a knuckle, chassis part or the like. When the bolt is torqued, a slip contact surface is established for the joint between the metal inner sleeve and the mating suspension component.

The joint's slip load is established based on the clamping force supplied by the bolt and the coefficient of friction between the metal inner sleeve and the mating suspension component. The coefficient of friction varies based on the relative roughness of the mating surfaces, the presence of surface coatings or contaminants and the amount of embedment created by the joint into the mating component. The amount of embedment is particularly difficult to control especially in light of a preference to utilize lighter, softer materials.

Therefore, to provide consistent predetermined slip load characteristics for a single shear joint such as a suspension link joint, a new construction is required.

SUMMARY OF THE INVENTION

The present invention provides a single shear joint with improved slip load characteristics. A single shear joint in accordance with the present invention includes a link having an end opening containing a resilient bushing. The single shear joint is formed between the link and a mating component.

The resilient bushing includes a central opening coaxial with the end opening and contains an inner sleeve. The inner sleeve engages a conical ferrule which in turn is positioned in a countersunk opening in the mating component thereby providing controlled embedment. A bolt extends through the inner sleeve and the conical ferrule engaging the mating component and connecting the link to the mating component forming the joint. A second ferrule is optionally positioned against the inner sleeve at its end opposite the end containing the conical ferrule for engaging the head of the bolt.

The conical ferrule enhances the joint's performance, which does not depend on high torque but can withstand overtorque.

DETAILED DESCRIPTION OF THE PRESENTLY PREFERRED EMBODIMENTS

Figure 1:
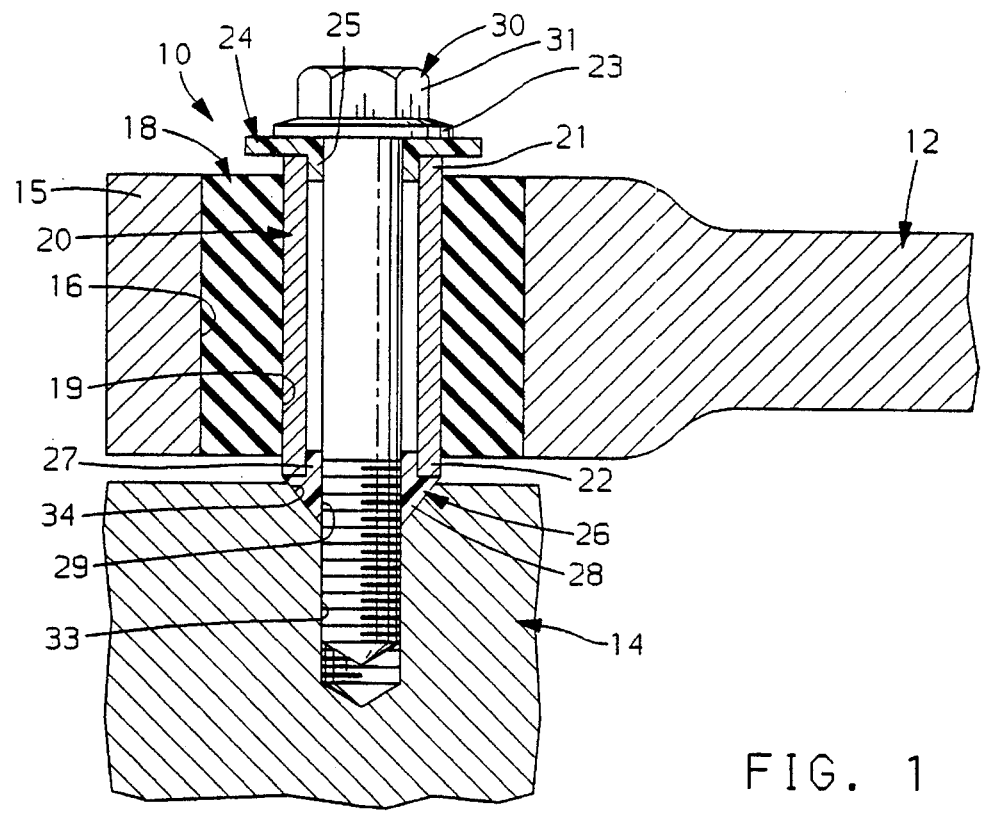
FIG. 1 is a cross-sectional view of a single shear joint embodied as a suspension link joint.

Referring to FIG. 1, a suspension link joint designated generally as 10 is illustrated. The suspension link 12 is connected by the joint 10 to a mating suspension component 14 forming a single shear joint. The mating suspension component 14 may be an item such as a knuckle or a part of the chassis. The suspension link 12 includes a substantially flattened end 15. Extending through the end 15 is an opening 16. The opening 16 includes a resilient bushing 18 which is made of a conventional material. Extending through resilient bushing 18 is an opening 19 coaxial with the opening 16 of suspension link 12.

An inner sleeve 20 which is cylindrical in configuration and constructed of a rigid material extends through opening 19 of resilient bushing 18. Inner sleeve 20 includes ends 21 and 22 which extend from the opening 19. A ferrule 24 having an annular leg 25 extending into the end 21 is press fit onto inner sleeve 20. Annular leg 25 engages the inside diameter of inner sleeve 20. Alternatively, such as in applications wherein inner sleeve 20 fits closely around bolt 30, annular leg 25 engages the outside diameter of inner sleeve 20.

A conical ferrule 26 includes an annular leg 27 which is press fit into the end 22 of inner sleeve 20. Conical ferrule 26 includes a body 28 in the form of a conical-shaped frustum and has an opening 29 extending through the body 28 and the annular leg 27. Annular leg 27 engages the inside diameter of inner sleeve 20. Alternatively, for applications wherein the inner sleeve 20 fits closely around the bolt 30, annular leg 27 is formed to engage the outside diameter of inner sleeve 20.

Bolt 30 extends through ferrule 24, inner sleeve 20 and conical ferrule 26. Bolt 30 includes a head 31 and flange 23, which engages ferrule 24. Mating suspension component 14 exhibits threaded opening 33 with countersunk portion 34. Countersunk portion 34 receives conical ferrule 26 and bolt 30 is torqued into threaded opening 33 to retain suspension link 12 in a joined relationship with mating suspension component 14.

The construction of joint 10 provides an assembly wherein the bolt 30 pre-loads the suspension link 12 into engagement with the mating suspension component 14 such that a slip joint between suspension link 12 and mating suspension component 14 is established with a reduced torque applied to bolt 30 relative to conventional joint construction. The conical ferrule 26 provides a mechanism for increasing the amount of load required to produce relative motion or slip between suspension link 12 and mating suspension component 14.

The joint 10 prevents unwinding of the assembly and provides an acceptable load distribution with reduced fatigue. The amount of pre-loading provided by the bolt 30 between the conical ferrule 26 and the mating suspension component 14 is tunable according to the amount of force required to be carried by the suspension link 12. The construction of joint 10 is particularly beneficial in providing joint strength when mating suspension component 14 is comprised of a relatively soft material such as aluminum.

Figure 2:
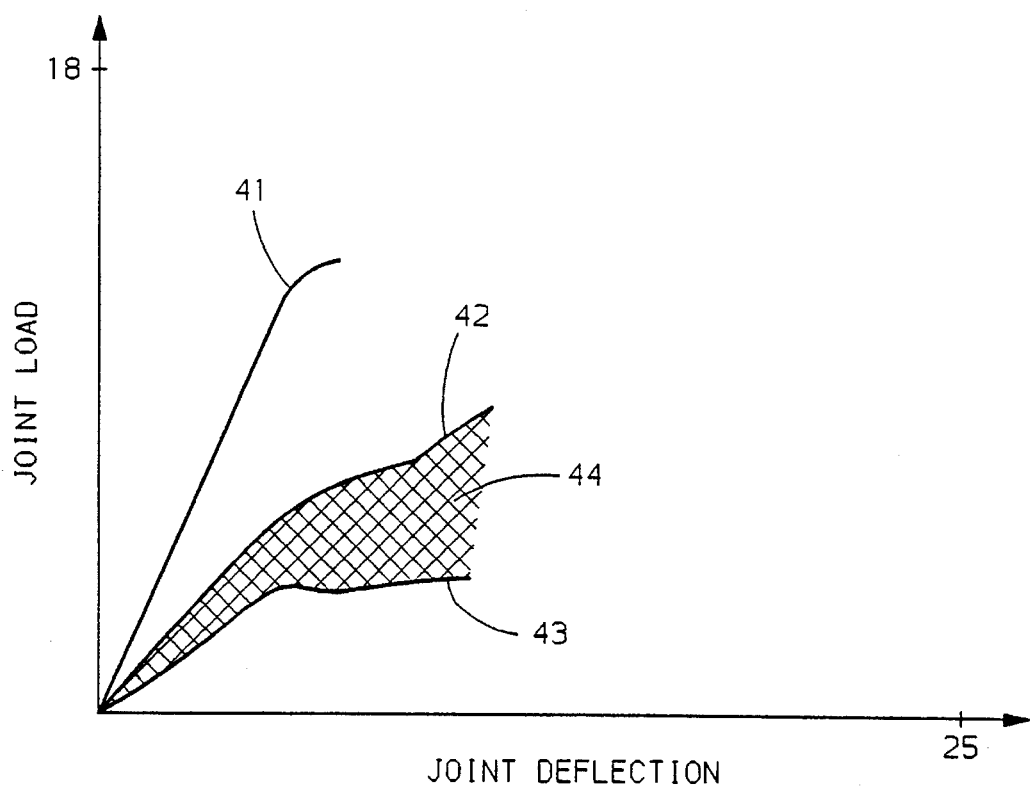
FIG. 2 is a graph of joint load versus joint deflection for various single shear joint arrangements.

Referring to FIG. 2, a graph of joint load versus joint deflection for various joint constructions is illustrated. Curve 41 illustrates deflection of the joint 10 for various quantities of applied joint loads. Curve 42 illustrates joint deflection for a suspension link joint (not illustrated), wherein a serrated ferrule is used in place of the conical ferrule 26 which contacts a flat surface of the mating suspension component rather than a countersunk portion such as countersunk portion 34 thereby providing some embedment control. Curve 43 illustrates the performance of a suspension link joint (not illustrated), wherein a plain washer is provided in place of conical ferrule 26 which engages a flat surface of the mating suspension component. Deflection for a joint (not illustrated), having uncontrolled embedment wherein the inner sleeve directly contacts a flat surface of the mating suspension component generally falls within range 44 between curves 42 and 43. Therefore, the graph indicates that the construction of the present invention provides a joint of relatively high strength. Joint 10 produces a wedging effect between the conical ferrule 26 and the countersunk portion 34 of mating suspension component 14 and optionally provides the ability to reduce torque requirements between the bolt 30 and the mating suspension component 14.

What is claimed is:

1. A suspension link joint comprising:

a suspension link having a first opening;

a mating suspension component joined with the suspension link at the suspension link joint and including a threaded opening with a countersink portion;

a conical ferrule positioned between the suspension link and the mating suspension component and seated in the countersink portion;

a metal sleeve extending completely through the first opening and engaging the conical ferrule; and a fastener having a head and extending through the metal sleeve and the conical ferrule wherein the fastener is threadedly engaged in the threaded opening so that the head forces the metal sleeve against the conical ferrule providing a tunable preload between the conical ferrule and the mating suspension component.

2. A suspension link joint comprising:

a suspension link having a first opening;

a mating suspension component exhibiting a second opening having threads and a countersink portion;

a resilient bushing positioned in the first opening of the suspension link and having a third opening;

a metal inner sleeve positioned in the third opening of the resilient bushing so that the metal sleeve extends completely through the first opening of the suspension link;

a conical ferrule having an annular leg pressed into the inner sleeve and positioned between the suspension link and the mating suspension component so that the conical ferrule is seated in the countersink portion; and a fastener having a head and extending through the first opening, the inner sleeve and the conical ferrule and engaging the mating suspension component at the second opening wherein the fastener is threadedly engaged in the second opening so that the head forces the inner sleeve against the conical ferrule providing a tunable preload between the conical ferrule and the countersink portion of the mating suspension component.

3. A suspension link joint according to claim 2 further comprising a second ferrule positioned between the head and the inner sleeve the second ferrule having an annular leg pressed into the inner sleeve so that the fastener is securely positioned in the inner sleeve by the conical ferrule and the second ferrule and wherein the fastener is spaced away from the inner sleeve by the conical ferrule and the second ferrule.

4. A suspension link joint comprising:

a suspension link having an end with a first opening;

a mating suspension component exhibiting a second opening with a countersink and threads, the mating suspension component being joined with the suspension link;

a resilient bushing positioned in the first opening of the suspension link and having a third opening;

an inner sleeve positioned in the third opening of the resilient bushing and extending completely through the first opening of the suspension link;

a conical ferrule having an annular leg pressed into the inner sleeve and having a conical body seated in the countersink of the mating suspension component; and a bolt having a head and extending through the inner sleeve and the conical ferrule and engaging the mating suspension component in the second opening wherein the bolt is threadedly engaged in the second opening so that the head forces the inner sleeve against the conical ferrule providing a tunable preload between the conical ferrule and the countersink of the mating suspension component the tunable preload embedding the conical ferrule in the countersink of the mating suspension component in a controlled manner and minimizing deflection of the suspension link joint for an applied joint load.

* * * * *